United States Patent [19]

Farrell

[11] 4,038,006
[45] July 26, 1977

[54] APPARATUS FOR MAKING A BLOW MOLDED CONTAINER WITH HOLLOW HANDLE AND METHOD OF MAKING

[75] Inventor: John J. Farrell, Green Brook, N.J.

[73] Assignee: Farrell Patent Company, Greenbrook, N.J.

[21] Appl. No.: 641,482

[22] Filed: Dec. 17, 1975

Related U.S. Application Data

[62] Division of Ser. No. 479,547, June 4, 1974, Pat. No. 3,928,522.

[51] Int. Cl.² .......................................... B29C 17/07
[52] U.S. Cl. ...................................... 425/525; 425/533
[58] Field of Search ................. 425/242 B, DIG. 209, 425/DIG. 214, DIG. 215

[56] References Cited

U.S. PATENT DOCUMENTS

| 2,951,264 | 9/1960 | Bailey | 264/98 |
|---|---|---|---|
| 3,159,697 | 12/1964 | Tocci | 425/DIG. 214 |
| 3,649,728 | 3/1972 | Honsho et al. | 425/157 |
| 3,662,048 | 5/1972 | Turner | 425/326 B |
| 3,776,991 | 12/1973 | Marcus | 425/DIG. 216 |
| 3,781,395 | 12/1973 | Uhlig | 425/DIG. 216 |

Primary Examiner—Richard B. Lazarus
Attorney, Agent, or Firm—Marvin Feldman; Stephen E. Feldman

[57] ABSTRACT

A plastic container having a bail handle on one side, blown as one-piece with the container, is formed by injection molding a parison with a thickened portion then blow molding in a cavity having a portion into which the thickened portion of the parison is displaced to form a handle portion. A shearing operation is then performed on the partially blown container. In this operation part of the handle portion is compressed to a flat condition and displaced from the container between the body of the container and the part of the handle portion that will constitute the actual handle of the final container. The container is then blown to its final size, preferably in a second blowing mold. The apparatus used to make the container is also novel.

9 Claims, 5 Drawing Figures

APPARATUS FOR MAKING A BLOW MOLDED CONTAINER WITH HOLLOW HANDLE AND METHOD OF MAKING

This is a division of application Ser. No. 479,547, filed June 14, 1974, and now U.S. Pat. No. 3,928,522.

BACKGROUND AND SUMMARY OF THE INVENTION

This invention provides an improved method and apparatus for making blown plastic containers which have a hollow handle on one side with the handle of one-piece construction with the body of the container. The container is formed on an injection molding machine with a special pre-blow mold having a cavity into which a part of a parison is displaced to form a handle portion of the partially blown container. This handle portion which is hollow and curved along its outer edge region to the shape of the final handle, is then collapsed or compressed over a portion of its area.

The compressed area comprises the area between the body of the partially blown container and the outer part of the handle portion which will constitute a hollow bail handle of the final product. The compressed part of the handle portion is sheared from the remainder of the partially blown container and this shearing operation is performed while the molten material of the parison is still hot enough to seal over the lines where the compressed plastic is separated from the hollow portions of the partially blown container. These hollow portions are the handle along its entire length and the body portion to which the handle connects.

The blowing mold in which the parison is initially blown to form the partially blown container is of special construction. It has a plunger, shaped to the area which is to be compressed, and has a complementary support on the opposite side of the area that is to be compressed. The plunger and the support are both movable so as to apply force to opposite sides of the area of the handle portion which is to be compressed between them. After compressing the plastic between the plunger and the support so as to make it no longer hollow, the plunger and support are then moved in such a way as to shear the compressed area from the remainder of the handle portion, which is still hollow, and from the side of the partially blown container.

The sheared material is moved downward in the die and the apparatus has means for stripping the sheared material from the support so that it can be discharged to a waste receptacle and leave the support clear for operation on a second partially blown container.

The plunger and the support form portions of the wall of the cavity space into which plastic is displaced to make the handle portion.

Another feature used in the preferred embodiment of the invention is the stretching of the parison for a substantial distance lengthwise of the core rod on which the parison is formed. This stretching is preferably done after an initial blowing or the parison to free it from friction against the core rod and the stretching is preferably formed by the pressure of the blowing fluid that is introduced into the parison.

The blow mold in which the container is partially blown is preferably made with a diameter only slightly greater than the diameter of the original parison so that the initial blowing in the first blow mold does not expand the diameter or the circumference to any great degree but does the consequential stretching of the plastic for axial orientation in a lengthwise direction where the cavity of the mold is substantially longer than the parison.

In order to prevent sagging of the extended end of the parison, while in the first blow mold and during transfer from the first blow mold to a second blow mold, the preferred embodiment of the invention has a core rod with an end portion which telescopes into the main portion of the core rod. During stretching of the parison, the end of the core rod, which is telescoped into the main portion, is extended to a length approaching that of the partially blown parison so as to provide a support, if necessary, for the end of the parison which is beyond the original end of the core rod.

In the preferred embodiment, the partially formed container and its hollow handle are transferred to a second blow mold with a cavity shaped to the final coutour of the container and in a subsequent blowing step, in this second blow mold, the partially blown container and handle are expanded to their final shape and size.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
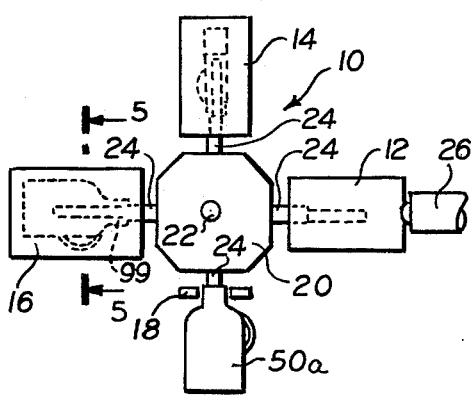
FIG. 1 is a diagrammatic top plan view of injection blow molding apparatus for making the containers with handles in accordance with this invention.

FIG. 1 shows an injection blow molding machine 10 having an injection station comprising a mold 12; a first blowing station comprising a blowing mold 14; a second blowing station comprising a blowing mold 16 and a fourth station comprising a stripper 18. These stations are located at 90° angular spacing around an indexing head 20 which rotates about a center shaft 22. Indexing head 20 has four faces corresponding to the operational stations with the molds 12, 14, 16 and the stripper 18.

A core rod 24 extends from each of the faces of the indexing head 20. Only one core rode 24 is shown for each face; but it will be understood that conventional blow molding machines have a plurality of core rods extending from each face and the core rods 24 are merely representative of core rods for carrying a parison and workpiece successively from one operational station to the next.

Molten plastic from a plasticizer 26 is injected into the mold 14 to coat the core rod 24 with a parison in accordance with conventional practice.

When the mold 12 opens, the indexing head 20 rotates 90° and carries the core rod 20 to the next operational station where the core rod and the parison are inserted into a mold 14.

Figure 2:
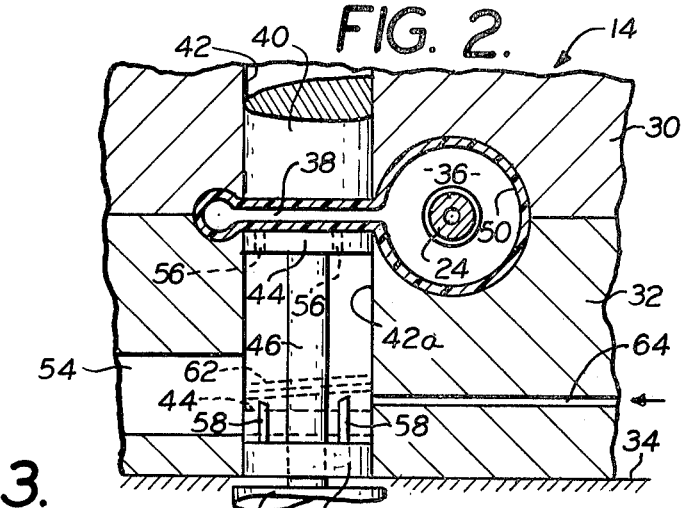
FIG. 2 is a fragmentary, greatly enlarged, sectional view on the line 2—2 of FIG. 1.

FIG. 2 shows the special construction of the first blow mold 14. This mold 14 has an upper section 30 and a lower section 32. The lower section 32 is connected to a fixed platen 34; and the upper section 30 moves up and down to open and close the mold in the conventional manner. The mold 14 has a cavity 36 which is of unusual construction. On one side of the core rod 24, the left side in FIG. 2, the cavity 36 extends for a substantial distance to form what may be termed a handle portion 38 of the cavity 36. Part of the wall of this cavity portion 38 is formed by the lower end of a generally semicircular plunger 40, which slides up and down in a guideway 42 of the same cross section as the plunger 40.

A part of the lower surface of the handle portion 38 of the cavity is formed by the top surface of a support 44 located at the upper end of a piston rod 46. The cross section of the support 44 is substantially the same as that of the plunger 40. The support 44 slides in a guideway 42a which is actually a continuation of the guideway 42. The piston rod 46 is moved up and down by a cylinder-and-piston motor 48.

In the operation of the mold 14, the blowing of the parison expands it to the walls of the cavity 36, including the handle portion 38 of the cavity, but the cavity preferably contains air on the outside of the parison during the blowing operation. This air is preferably subject to some pressure during the blowing so as to act as a barrier to the expansion of the parison and preferably the compressing of the air in the cavity around the outside of the parison is sufficient to hold the plastic slightly spaced from the cavity wall or in only light contact with the wall so as to provide for lengthwise stretching of the parison in the body portion of the cavity 36 as will be explained in connection with FIG. 3.

The cavity 36 is substantially smaller than the intended final cross section of the container and the parison, partially blown to form a container, in indicated in FIG. 2 by the reference character 50.

When the plastic of the partially blown container 50 has reached the limits imposed by the cavity of the mold 14, and any barrier pressure within the mold, the plunger 40 and support 44 apply pressure to opposite sides of the area of the handle portion which is to be removed from the mold 14.

FIG. 2 shows the entire handle portion of the partially blown container 50 to be hollow; and it should be understood that in the molding of the parison on the core rod in the injection mold 12 (FIG. 1) there is more plastic applied to the side of the parison which will confront the handle portion 38 in the mold 14. Thus in the first blowing of the container 50, there is ample plastic to expand into the handle portion 38 of the cavity without causing a substantial reduction in the thickness of the wall across the handle portion 38.

After the partial blowing of the container 50 in the mold 14, the plunger 40 and support 44 apply pressure to opposite sides of the hollow center portion in the handle portion 38 of the mold cavity and collapse this hollow portion so that the upper and lower parts of the handle portion, between the plunger 40 and support 44 are pressed into contact with one another.

The plunger 40 continues to move downward and to press the support 44 downward until the support 44 reaches the broken line position indicated in dotted lines. In this lowered position, the support 44 is in line with a discharge outlet 54 opening through a side of the lower mold section 32. There are two openings 56 through the support 44. Pins 58 extend upward from a fixed plate 60; and these pins 58 are in line with the openings 56 and small enough to extend through the openings 56 and protrude above the top of the support 44 when the support is in its lowermost position, as indicated by broken lines in FIG. 2.

The material sheared from the handle portion of the partially blown container 50 is indicated in broken lines by the reference character 62. The pins 50 hold this sheared plastic 62 against further downward movement as the support 44 completes its downward stroke. Thus the sheared plastic 62 is stripped from the support 44, as shown in FIG. 2. A blast of air through a passage 64, which opens into the guideway 42a, blows the sheared plastic 62 out of the lower section of the mold through the discharge outlet 54. This construction for stripping and discharging the sheared plastic 62 is merely representative of means for removing the sheared plastic from the mold 14.

Figure 3:
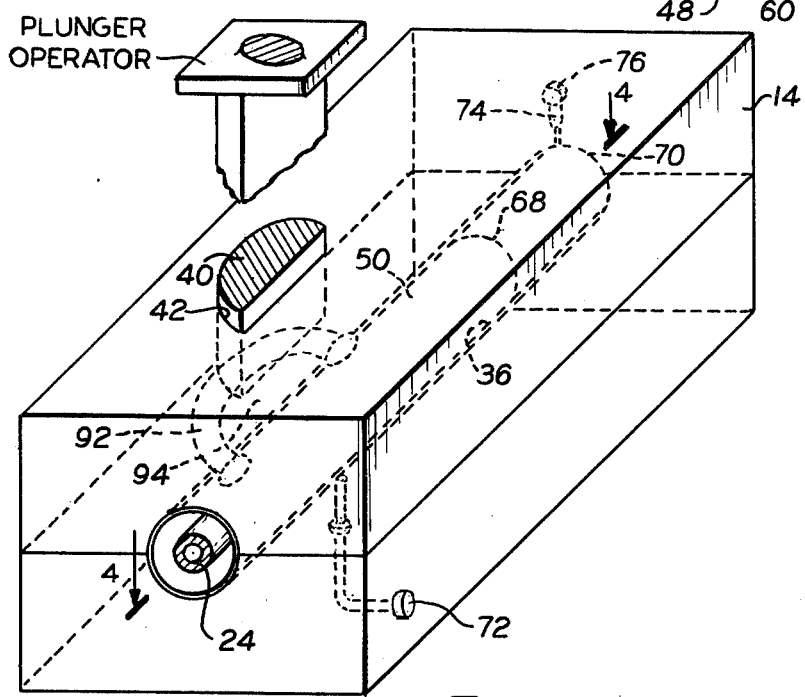
FIG. 3 is a diagrammatic, isometric view of the first blowing mold shown in FIGS. 1 and 2.

FIG. 3 is a diagrammatic showing of the mold 14 with the cavity 36 extending for a substantial distance beyond a plane 68 which marks the limit to which the parison extended in the mold cavity 36 prior to blowing of the parison. An end wall 70 of the cavity 36 determines the extent to which the partially blown parison can extend during the blowing operation in the mold 14. These is an air inlet passage 72 leading to the cavity 36 for supplying air for the barrier or cushion against total expansion in the cavity 36, as previously explained. There is an air outlet 74 at the far end of the cavity 36 which is adjustable to control the rate of escape of air from the cavity and the resulting cushioning effect. This adjustment is effected by a needle valve 76 on the exhaust outlet 74.

The plastics of the partially blown container 50 is stretched in the direction of the length of the core rod 24 as a result of air introduced into the interior of the parison while the plastic of the parison is free to expand all the way to the end face 70 of the mold 36; of just short of the end face as a result of the cushion of air caused by the supply of air under pressure through the inlet 72 at a slightly higher rate than the discharge of air from the outlet 74. This air cushion prevents the plastic from pressing against the side wall of the cavity 36 with sufficient friction to prevent expansion and stretching of the parison lengthwise along substantially the full length of the cavity 36.

Figure 4:
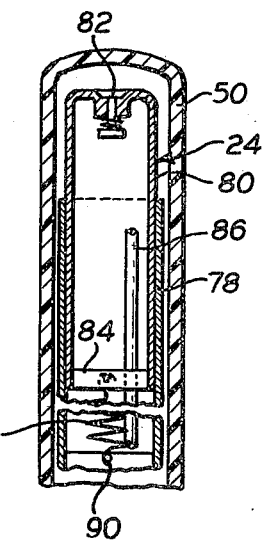
FIG. 4 is a fragmentary, diagrammatic and greatly enlarged view through the core rod when expanded as in the first blowing mold; the view being taken along the line 4—4 of FIG. 3.

FIG. 4 is a diagrammatic showing of the end portion of the core rod 24. The main body of the core rod, toward its outer end is a tubular structure 78. There is an end portion 80 of the core rod which telescopes into the tubular structure 78 as shown in FIG. 4. A check valve 82 in an end face of the end portion 80 prevents plastic from entering the core rod during the injection of the parison over the core rod.

The telescoping end portion 80 has a piston 84 closing its open cross section at one location; and when air is introduced into the core rod 24 behind the piston 84, the piston 84 pushes the telescoping end portion 80 forward to extend the length of the core rod so that there is a support for the partially blown parison or container 50 while in the mold 14 and during transfer of the partially blown container 50 to the second blowing mold 16 (FIG. 1).

FIG. 4 also shows a tube 86 which extends through an opening in the piston 84 and this tube 86 extends back to a source of compressed air which is used for blowing the parison on the core rod independently of any movement of the telescoping end portion 80.

Whenever the pressure behind the piston 84 is relieved, a spring 88, connected at opposite ends to the piston 84 and to a fixed pin 90 in the core rod, retracts the telescoping portion 80 back into the main body of the core rod 24.

Referring again to FIG. 3, a bail handle 92 is shown extending from one side of the partially blown container 50. A clearance between the mid portion of the handle 92 and the wall of the partially blown container 50 is indicated by the reference character 94. This clearance provides room for the insertion of the fingers of a human hand between the main grip portion of the handle 92 and the wall of the finally blown container 50. In the final blowing in the second blow told this clearance 94 is reduced somewhat if the cavity of the second blow mold permits further expansion of the diameter of the handle 92, as is preferably the case. The clearance 94 remains sufficient, however, for the admission of the fingers of the hand of a person lifting the final container.

Figure 5:
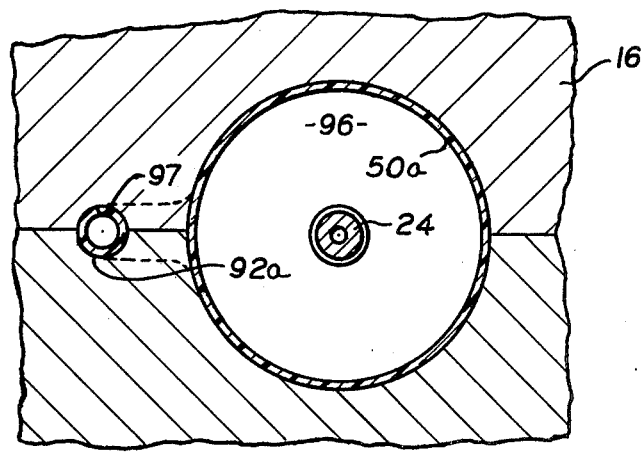
FIG. 5 is a greatly enlarged sectional view taken on the line 5—5 of FIG. 1.

FIG. 5 shows the container blown to its final cross section and indicated by the reference character 50a. The handle 92, blown to a slightly larger cross section, is indicated by the reference character 92a.

The mold 16 has a cavity 96 with a handle portion 97 shaped to the desired final contour of the handle 92a. It will be understood that the cavity 97 must be shaped to receive the handle portion 92 of the partially blown container 50.

The second blow mold 16 opens in the manner conventional with other blown molding apparatus and indexing head 20 (FIG. 1) turns 90° to carry the core rod 24 and the container 50a to the stripper station 18 at which the container 50a is pushed off the core rod 24, in accordance with conventional practice. The neck 99 of the container is handled at all of the operational stations in the manner conventional for blow molding containers with threaded or unthreaded neck portions.

The preferred embodiment of the invention has been illustrated and described, but changes and modifications can be made and some features can be used in different combinations without departing from the invention as defined in the claims.

I claim:

1. Apparatus for making an injection blow molded plastic container having a hollow handle projecting from a side of the container and of one-piece construction therewith, including in combination, an injection mold in which a parison is applied to a core rod, said injection mold being formed with a cavity so that the parison is thicker at that portion at which the handle is to be formed, a first blow station to which the core rod and parison are transferred, a first blow mold at the first blow station, having a cavity therein with a handle forming portion of the cavity for receiving the said thicker parison portion, means for applying fluid pressure to the inside of the parison to expand the said thicker parison portion into the handle portion of the cavity and to partially expand the remainder of the parison to a partially formed container, a part of the walls of the handle portion of the cavity of the first blow mold comprising mens to shear from the handle portion of the parison a part of the plastic thereof so as to form a hollow handle, a second blow mold, and means for transferring the partially blow container to the second blow mold, said second blow mold having a cavity with a handle portion shaped to the final contour for the container, and into which the hollow handle formed in the first blow mold is received, and means for supplying blowing fluid to expand the partially blown container in the second blow mold.

2. The apparatus of claim 1, said second blowing mold comprising means to simultaneously blow both the handle portion and the body of the container.

3. The apparatus of claim 1, said means to shear further comprising means to displace the sheared portion from the rest of the partially blown container.

4. The apparatus of claim 1, a supporting surface having means to apply a force to the one side of the plastic undergoing shear, means to lower the supporting surface with the sheared plastic thereon, and means to strip the sheared plastic from said supporting surface.

5. The apparatus of claim 1, means to confine the parison to a limited circumferential stretching in the first blow mold, and means to axially stretch the parison in the first blow mold, said first blow mold being formed so as to permit axial expansion of the parison.

6. The apparatus of claim 5, wherein the first blow mold cavity is formed so as to permit substantially full axial expansion of the parison therein.

7. The apparatus of claim 5, said means to confine the parison comprising means to provide an air cushion around the outside of the parison.

8. The apparatus of claim 5, means to extend the core rod to support the axially stretched parison.

9. The apparatus of claim 1, further comprising means apply a force transverse to the shearing force, to the sheared material for displacing same.

* * * * *